C. H. JACKSON.
RIDGER ATTACHMENT FOR PLOWS.
APPLICATION FILED JUNE 30, 1916.
1,298,047.
Patented Mar. 25, 1919.
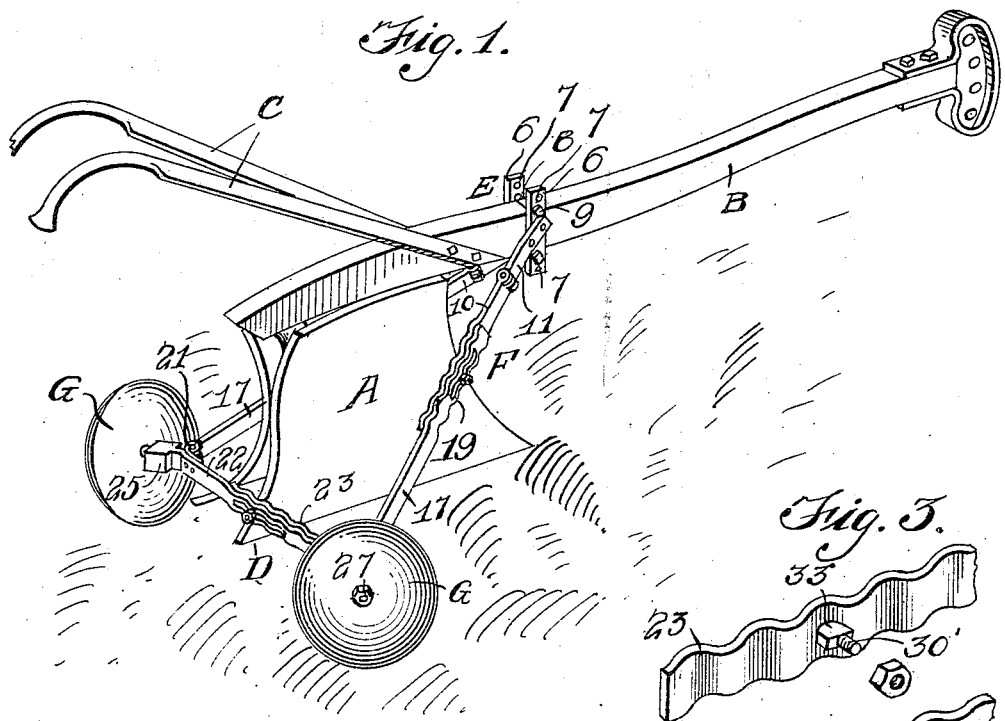
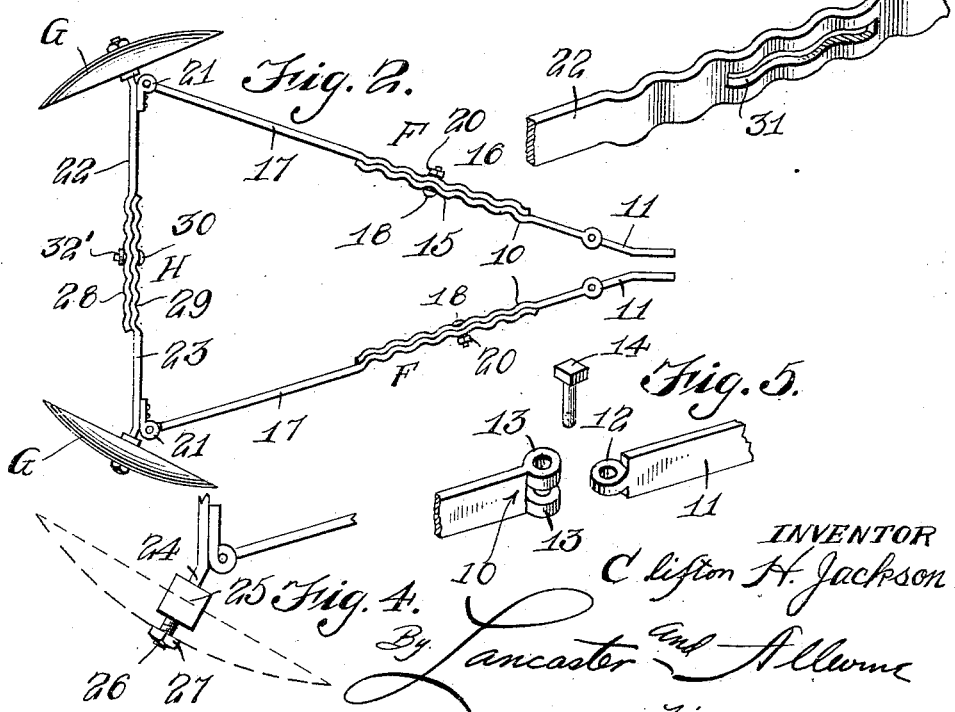
INVENTOR
Clifton H. Jackson
By Lancaster and Allwine
his ATTORNEYS

UNITED STATES PATENT OFFICE.

CLIFTON H. JACKSON, OF CLIO, SOUTH CAROLINA.

RIDGER ATTACHMENT FOR PLOWS.

1,298,047.  Specification of Letters Patent.  Patented Mar. 25, 1919.

Application filed June 30, 1916. Serial No. 106,831.

*To all whom it may concern:*

Be it known that I, CLIFTON H. JACKSON, a citizen of the United States, and resident of Clio, in the county of Marlboro and State of South Carolina, have invented a certain new and useful Improvement in Ridger Attachments for Plows, of which the following is a specification.

My present invention relates to agricultural implements, and more particularly to an attachment for double mold board plows, whereby ridges may be formed at each side of the furrow when the implement is brought into use.

The principal objects of my invention are to provide an attachment of the character described, which may be easily attached to existing plows enabling the user to prepare the soil for the reception of seed, at one operation, and to provide an attachment of the character described which is susceptible of adjustment so as to provide a furrow and ridges well adapted for the reception of the particular seed to be planted.

Other objects of my invention will appear in the following detailed description, taken in connection with the accompanying drawing, and forming a part of this specification, and in which drawing:

Figure 1 is a perspective view of a plow, showing a ridger constructed according to my invention, applied thereto.

Fig. 2 is a top plan view of the attachment.

Fig. 3 is a perspective view of the adjusable members of the attachment, the parts being separated from one another, to disclose details.

Fig. 4 is an enlarged detail view of means for attaching disks to other elements of the attachment.

Fig. 5 is a perspective view of hinge means for joining said elements of the attachment, the parts being shown separated to disclose details.

In the drawing, where similar characters refer to similar parts throughout the several views, A designates a plow proper; B the beam thereof; C handles; and D a ridger embodying a vertically adjustable coupling E, adjustable draft means F, disks G, and an adjustable carrier H for the disks G.

A common procedure in the planting of corn, is to first open a furrow by means of a small plow, follow this by use of an implement such as a cultivator, to provide ridges laterally of the furrow, and to then plant the small grain in the furrow, provided by the use of the two implements,—the plow and the cultivator. One of the principal objects of my invention is to provide an attachment for plows which will enable the operator to accomplish the object in view with much saving in time and labor.

In the example shown, the attachment is applied to a plow having a double moldboard, and by which a V-shaped furrow may be made.

In order that elements forming a part of the ridger may be adjusted in an upright direction, the coupling E is provided, also serving as a means for attaching the ridger to the plow beam B. This coupling may comprise two plates, one for each side of the plow beam, said plates provided with a plurality of perforations 7 through which bolts 8 extend, there being one bolt above and one below the plow beam, said bolts receiving nuts 9. By a coupling of this kind, the attachment may be adjusted longitudinally of the beam B as well as in a vertical direction.

Referring now to the draft means F, it comprises two draft rods 10, one at each side of the plow beam of plow A, said rods 10 having connection with the coupling through the intermediacy of hinge leaves 11, secured to the plates 6, so as to be rigid therewith. The leaves 11 may be provided with a single sleeve 12, while the upper end portion of each rod 10 may be provided with a plurality of sleeves 13 which, when axially alined with sleeve 12 may receive a bolt 14. By this construction, the rods 10, together with the members carried thereby, may be swung laterally of the plow A. Each rod 10 may be corrugated as at 15, to receive complemental corrugations 16 of the second draft rod 17, there being one rod 17 for each rod 10, said rods being held in adjusted relation one with another as by bolts 18, rigid with members 10, and extending through slots 19, longitudinally of rods 17 said bolts receiving nuts 20.

The rear end portions of means F are connected with the carrier H, as by hinge means 21, and which may be of a construction similar to that hereinbefore described.

Carrier H may comprise two rods 22, and 23, one end portion of each rod being disposed at an angle, as receiving bearing block 25, against which disk G engages, said disk being held in place as by screw threaded extension 26 from block 25, and nut 27 turned upon said extension. The rods 22 and 23 may be corrugated as at 28 and 29, the rod 23 having a bolt 30 rigid therewith, and extending through a slot 31, in rod 22, the bolt 30 to receive nut 32.

The disks G are preferably concave and disposed with the concavity facing the plow A. It is to be observed that the carrier H disposes these disks with their planes converging toward the rear of the implement.

The operation of the attachment is as follows:—

Having disposed the coupling E in operative relation to the beam B, the draft means F is adjusted to position the disks G at the desired distance to the rear of plow A. The carrier H is then adjusted to retain the disks in rigid spaced relation according to the distance desired between the outer margins of the ridges. This is followed by adjustment of the coupling E so as to dispose the lowermost portion of the disks G at the desired distance relative to the bottom of the plow A. It is to be observed that in such adjustment, neither the draft means F nor carrier H is placed under strain, inasmuch as a hinged connection between means F and coupling E, as well as between means F and the carrier H has been shown.

In Fig. 3 I have shown a modified form of adjustment between the rods 22 and 23, the bolt 30' being formed integral with rod 23 and provided with a rectangular portion 33 to fit in slot 31. It is to be observed, however, that when the nuts 20 and 32 of means F and carrier H are turned tight, the various elements will be alined in view of the arrangement of corrugations at engaging portions.

Changes in details may be made without departing from the spirit or scope of my invention; but,

I claim:—

A ridging attachment for turning plows comprising attaching means adapted for attachment to a plow beam, longitudinally extensible draft bars connected to said attaching means and angling outwardly and rearwardly therefrom, a longitudinally extensible brace bar connecting the rear ends of said draft bars and provided with rearwardly and outwardly angling spindles upon its ends, and ridging disks mounted upon said spindles.

CLIFTON H. JACKSON.

Copies of this patent may be obtained for five cents each, by addressing the "Commissioner of Patents, Washington, D. C."